US012559384B2

(12) United States Patent (10) Patent No.: US 12,559,384 B2
Song (45) Date of Patent: Feb. 24, 2026

(54) METHOD FOR MANUFACTURING IRON-CHROMIUM OXIDE USING ION EXCHANGE RESIN

(71) Applicant: Korea University Research and Business Foundation, Seoul (KR)

(72) Inventor: Sang Hoon Song, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 932 days.

(21) Appl. No.: 17/777,695

(22) PCT Filed: Nov. 30, 2020

(86) PCT No.: PCT/KR2020/017331
§ 371 (c)(1),
(2) Date: May 18, 2022

(87) PCT Pub. No.: WO2021/107740
PCT Pub. Date: Jun. 3, 2021

(65) Prior Publication Data
US 2023/0002240 A1 Jan. 5, 2023

(30) Foreign Application Priority Data

Nov. 29, 2019 (KR) ........................ 10-2019-0156996
Nov. 30, 2020 (KR) ........................ 10-2020-0164191

(51) Int. Cl.
*C01G 49/00* (2006.01)
*B01J 47/02* (2017.01)
*H01M 10/0525* (2010.01)

(52) U.S. Cl.
CPC .......... *C01G 49/0018* (2013.01); *B01J 47/02* (2013.01); *H01M 10/0525* (2013.01)

(58) Field of Classification Search
CPC .................................................. C01G 49/0018
See application file for complete search history.

(56) References Cited

FOREIGN PATENT DOCUMENTS

| CN | 101108365 A | 1/2008 |
| CN | 101357794 A | 2/2009 |
| KR | 10-0368754 B1 | 4/2003 |
| KR | 20-0331349 Y1 | 10/2003 |
| KR | 10-2009-0105868 A | 10/2009 |
| KR | 10-2011-0126300 A | 11/2011 |

(Continued)

OTHER PUBLICATIONS

Park, Donghee, et al. "Advanced kinetic model of the Cr (VI) removal by biomaterials at various pHs and temperatures." Bioresource technology 99.5 (2008): 1141-1147.*

(Continued)

*Primary Examiner* — Richard M Rump
(74) *Attorney, Agent, or Firm* — NSIP Law

(57) ABSTRACT

The present invention relates to a method of preparing an iron-chromium oxide using an ion-exchange resin. Moreover, the present invention relates to a method of preparing an iron-chromium oxide that can be used as a cathode material for lithium-ion batteries. According to one aspect of the present invention, it has the effect of providing a cathode material for lithium-ion batteries with a high capacitance, while exhibiting a voltage similar to that of a transition-metal oxide (2-4.5 V vs Li$^+$/Li).

6 Claims, 11 Drawing Sheets

(56) References Cited

FOREIGN PATENT DOCUMENTS

| KR | 10-2014-0038656 A | 3/2014 |
| KR | 10-2015-0118441 A | 10/2015 |
| KR | 10-2019-0065631 A | 6/2019 |

OTHER PUBLICATIONS

Wu, Shijiao, et al. "Removal of Cr (VI) from wastewater by FeOOH supported on Amberlite IR120 resin." Desalination and Water Treatment 57.38 (2016): 17767-17773.*

Grygar, T., et al., "Electrochemical Dissolution of Immobilized α-(Fe x Cr1-x) 2 O 3 Microparticles", Journal of the Electrochemical Society, 1999, (5 Pages in English).

Sun, Xiaokun et al., "Chromium (VI) Removal by Fe (III)-loaded Succinylated Mercerized Cellulose from Aqueous Solution", 2016, Bioresources.com, (p. 3038-3048).

Ramachandran, Tholkappiyan et al., "The effect of fuel to nitrates ratio on the properties of FeCr2O4 nanopowders", Materials Research Bulletin, Jul. 19, 2017, (11 Pages in English).

Extended European Search Report Issued on Jan. 22, 2024, in Counterpart European Patent Application No. 20892816.8 (7 Pages in English).

Korean Office Action Issued on Oct. 27, 2022, in counterpart Korean Patent Application No. 10-2020-0164191 (6 Pages in Korean).

Sivakumar, V., et al. "Electrochemical control of the magnetic moment of CrO2." Journal of the Electrochemical Society vol. 155.8 (Jun. 13, 2008): pp. 83-88.

Wilhelmi, Karl-Axel, et al. "The Crystal Structure of Cr 5 O 12." Acta Chem. Scand 19.1 (1965): pp. 165-176.

Hewston, T. A.et al. Chamberland. "Magnetic and structural studies of Cr2O5 and Cr3O8." Journal of magnetism and magnetic materials 43.1 (1984): pp. 89-95.

Norby, P., et al. "The crystal structure of Cr8O21 determined from powder diffraction data: thermal transformation and magnetic properties of a chromium-chromate-tetrachromate." Journal of Solid State Chemistry 94.2 (1991): pp. 281-293.

Liu, Jianyong, et al. "Synthesis and characterization of Cr8O21 as cathode material for rechargeable lithium batteries." Solid State Ionics 177.26-32 (May 17, 2006): pp. 2675-2678.

Feng, Xu-Yong, et al. "Synthesis and reversible lithium storage of Cr2O5 as a new high energy density cathode material for rechargeable lithium batteries." Journal of power sources 222 (Aug. 28, 2013): pp. 184-187.

Ozkendir, Osman Murat. "Electronic and crystal structure analysis of the FeCrO3 oxide." Journal of Electron Spectroscopy and Related Phenomena 191 (Oct. 23, 2013): pp. 54-59.

Korean Office Action issued on Apr. 12, 2022 in counterpart Korean Patent Application No. 10-2020-0164191 (5 pages in Korean).

* cited by examiner

【FIG. 1 】
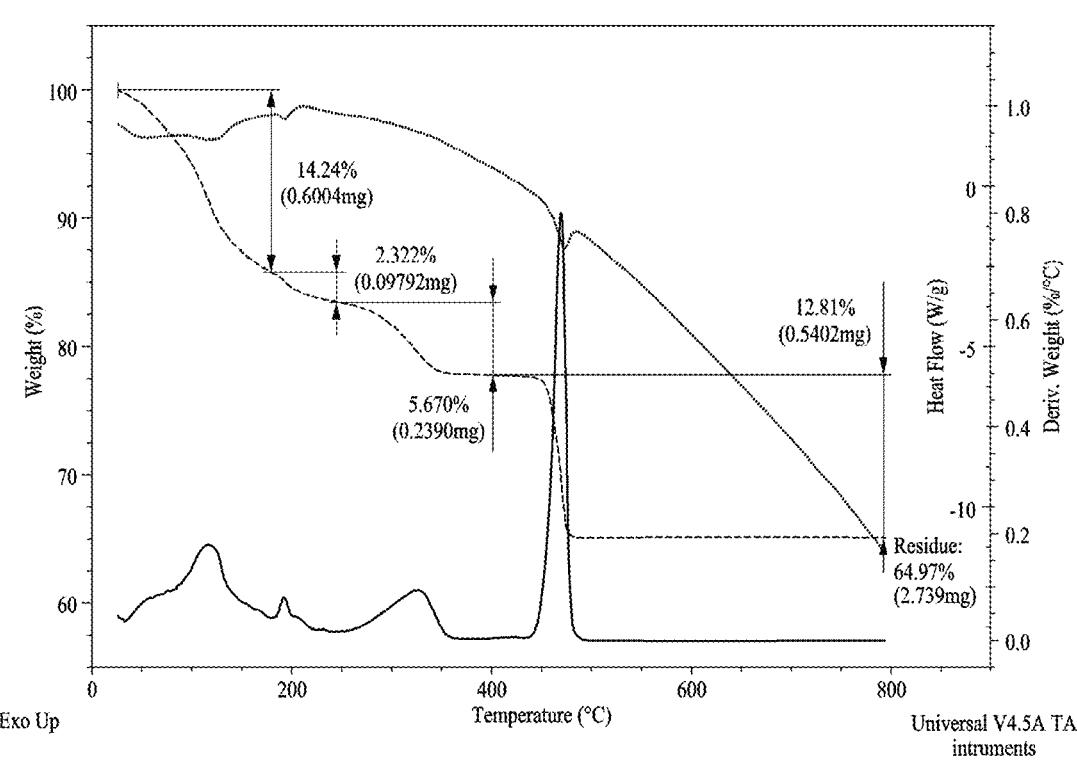

【FIG. 2 】
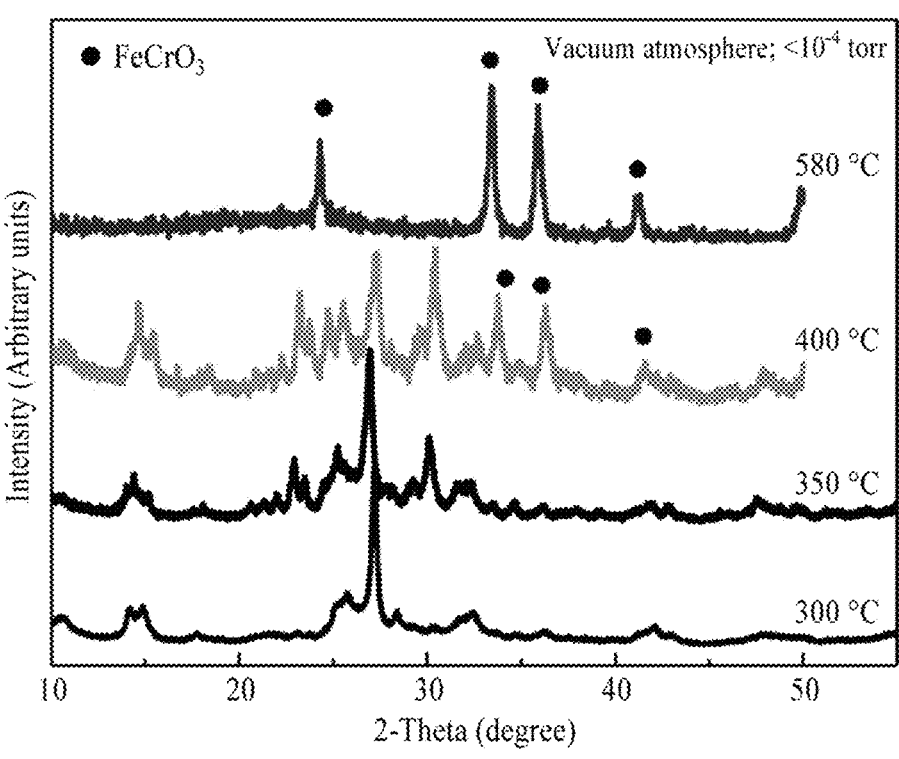

【FIG. 3 】
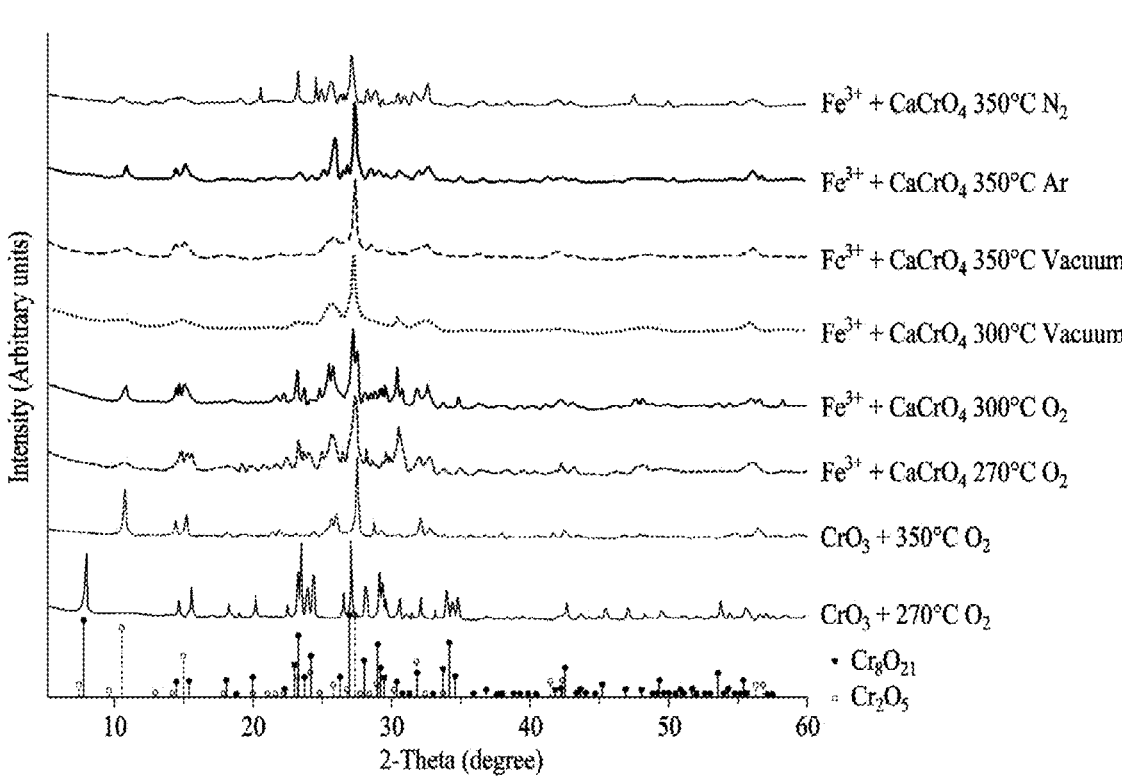

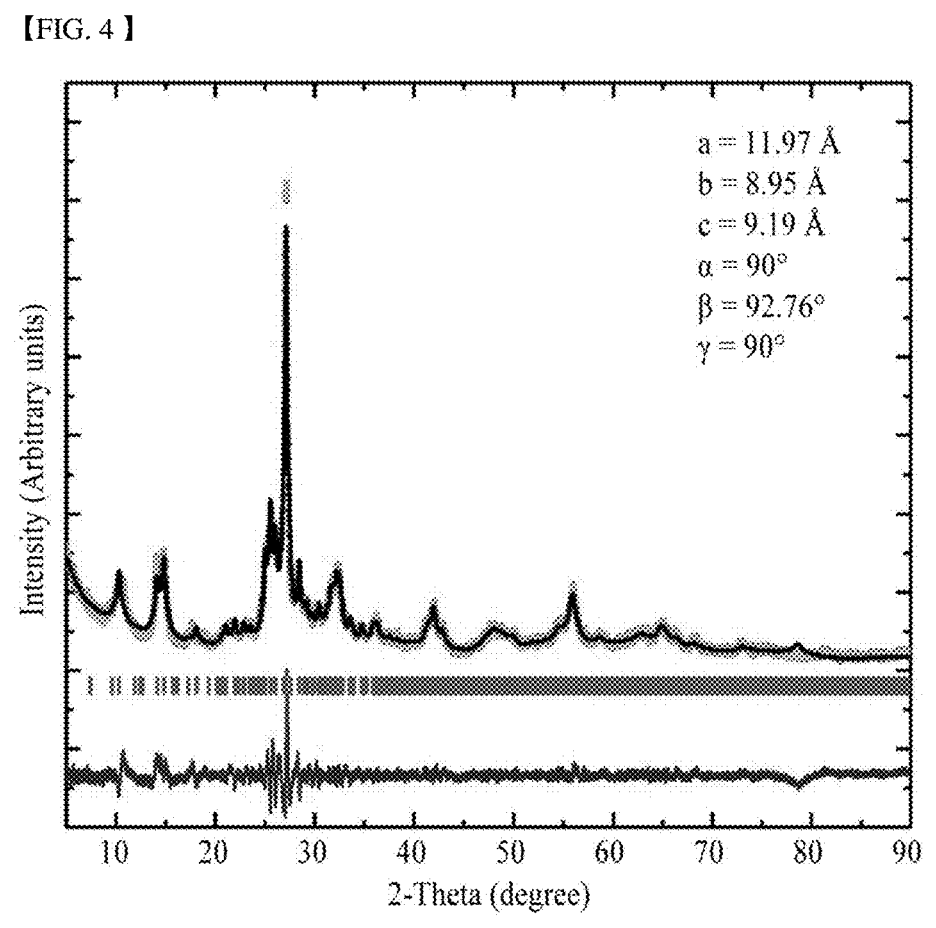

【FIG. 4 】

【FIG. 5A 】
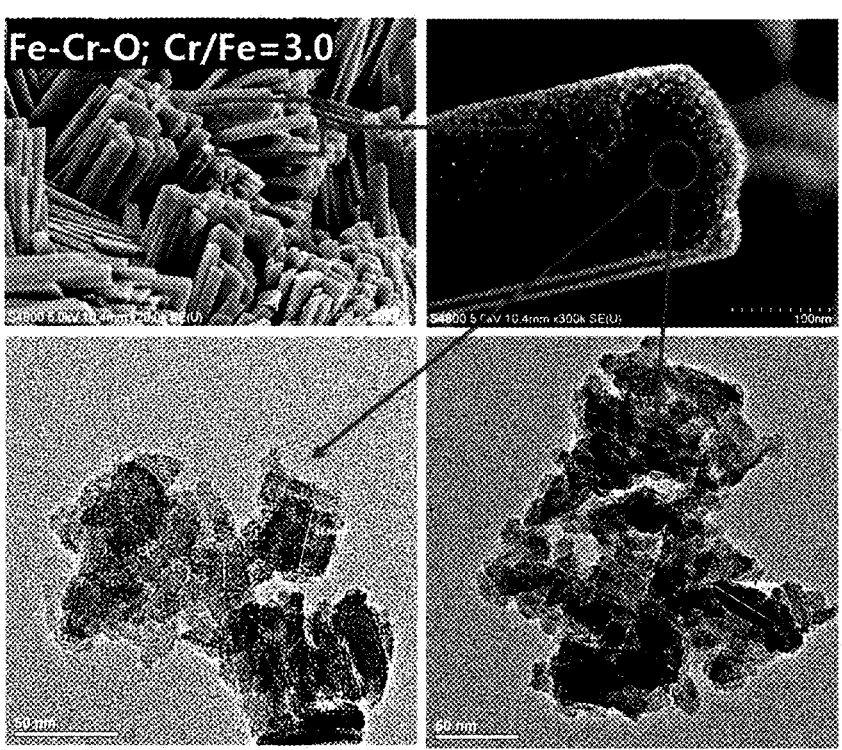
【FIG. 5B 】
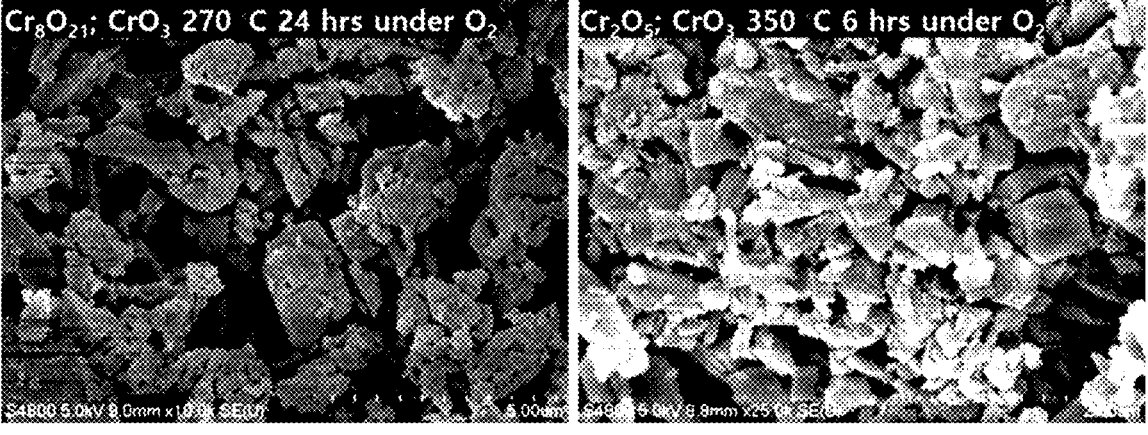

【FIGS. 6A】
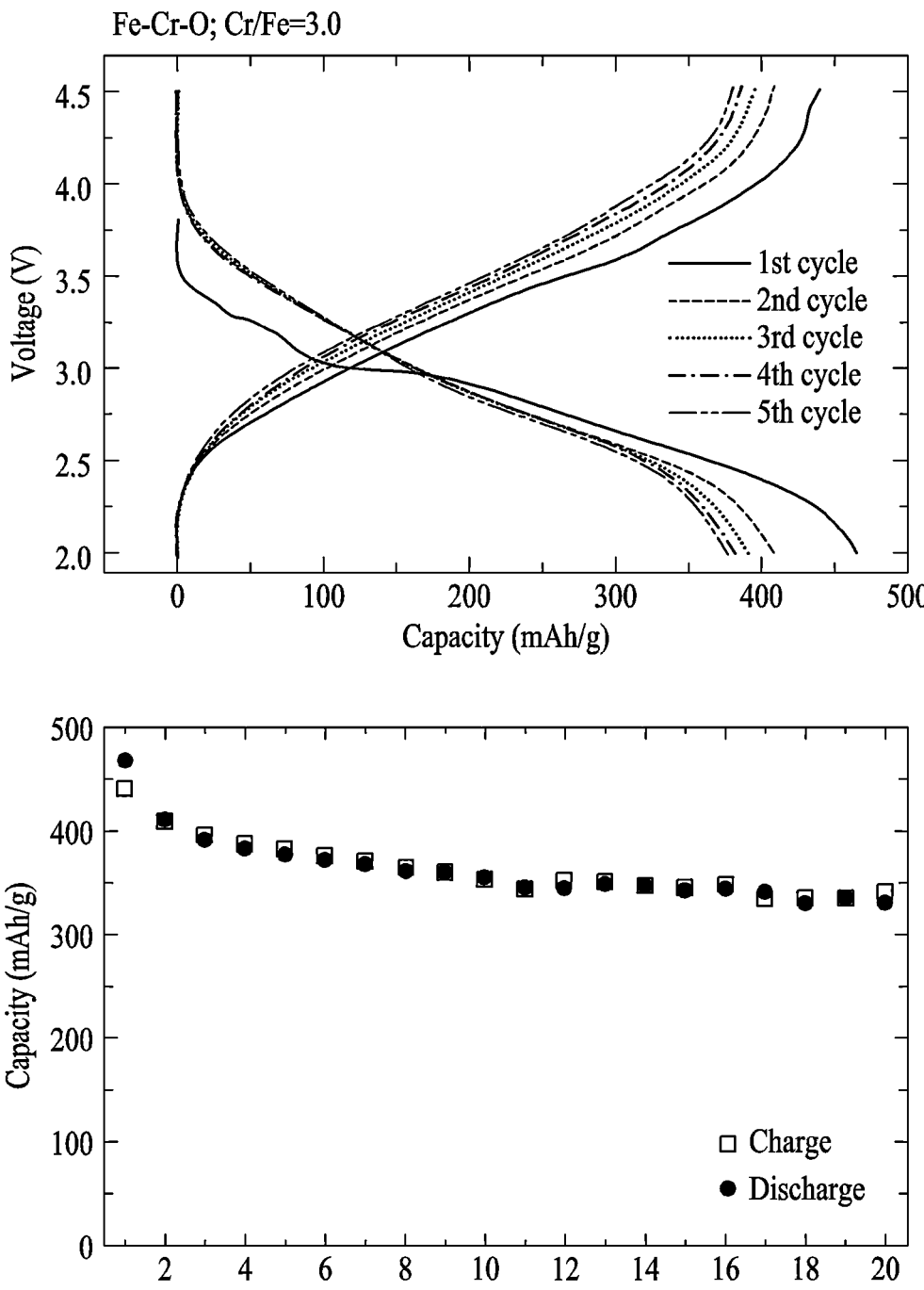

【FIGS. 6B】
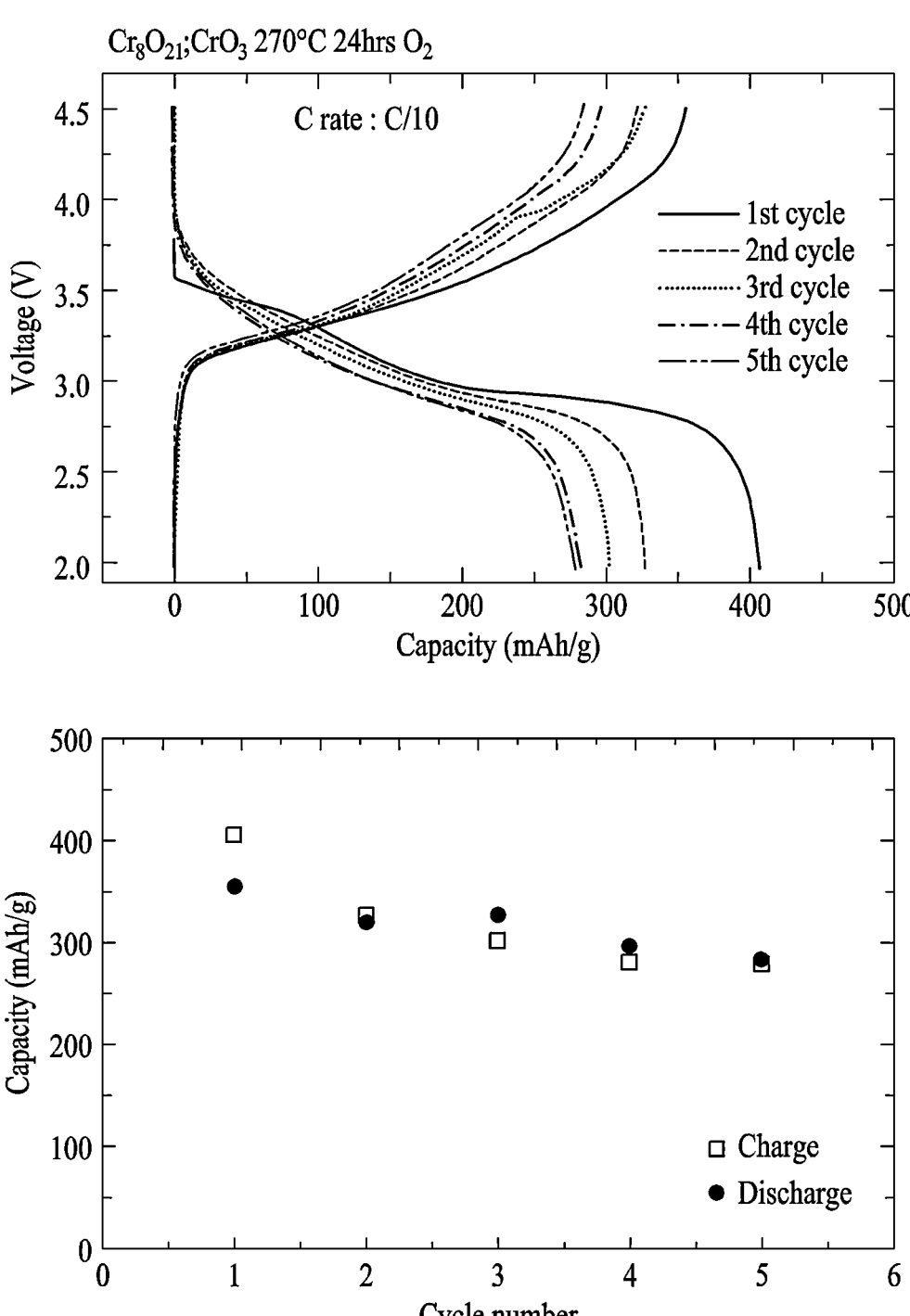

【FIGS. 6C】
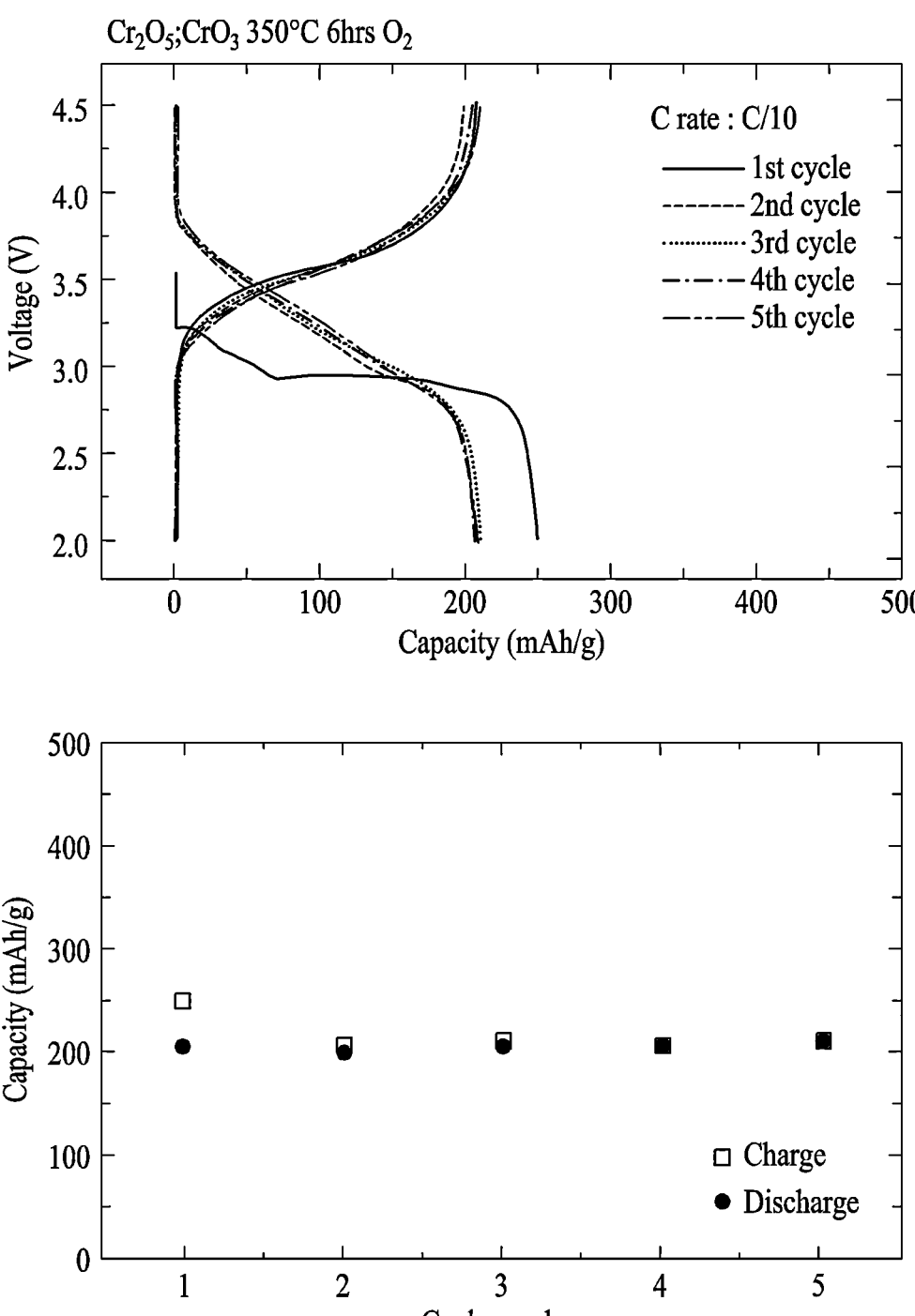

【FIG. 7 】
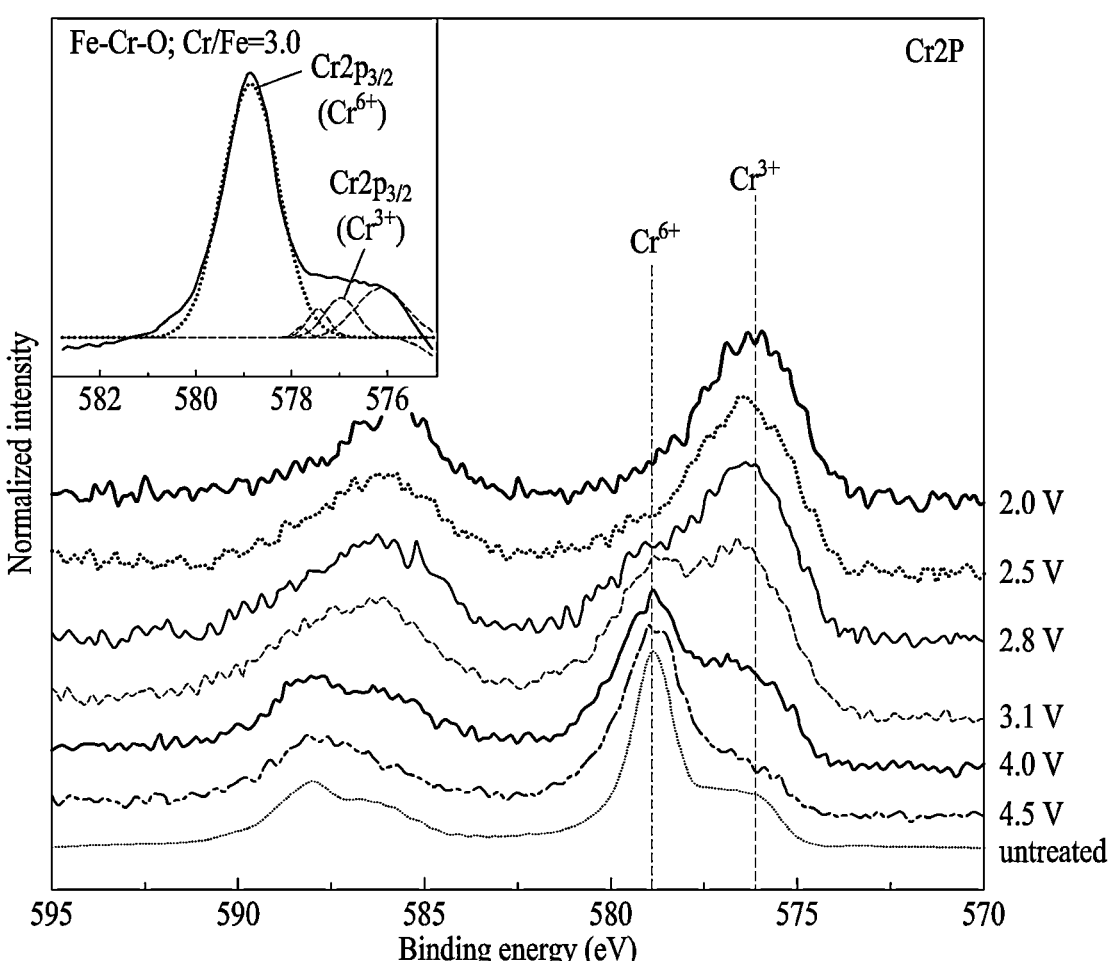

【FIG. 8 】
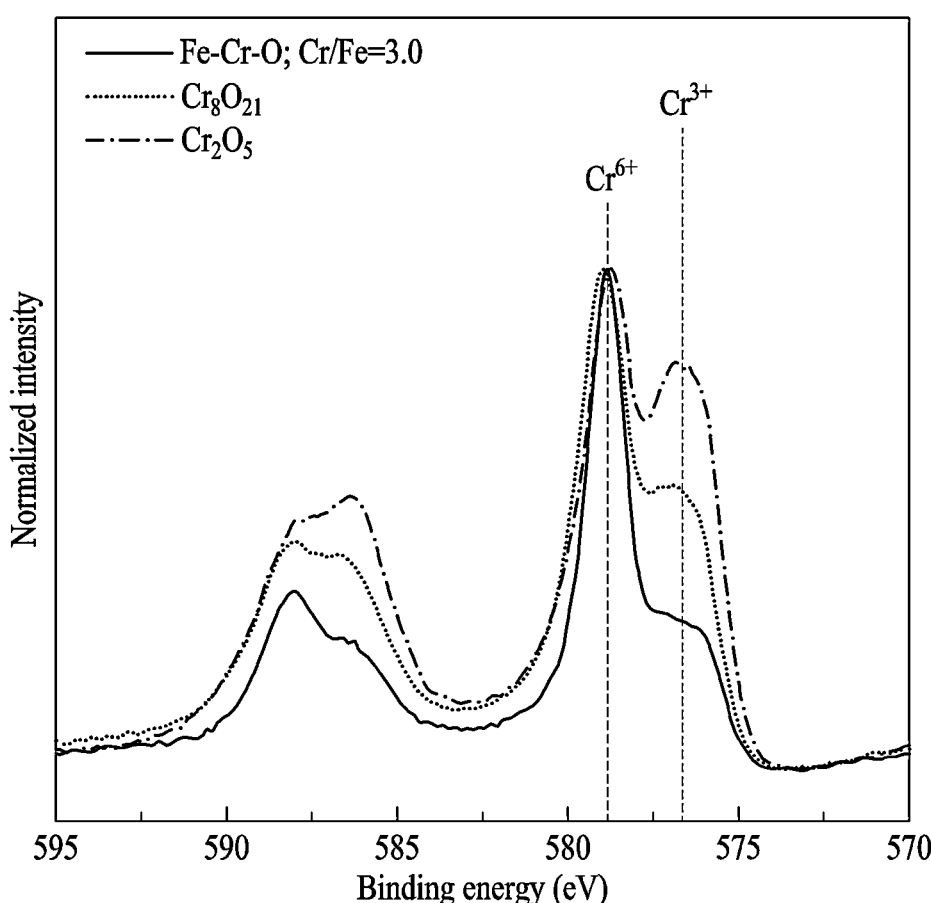

【FIG. 9 】
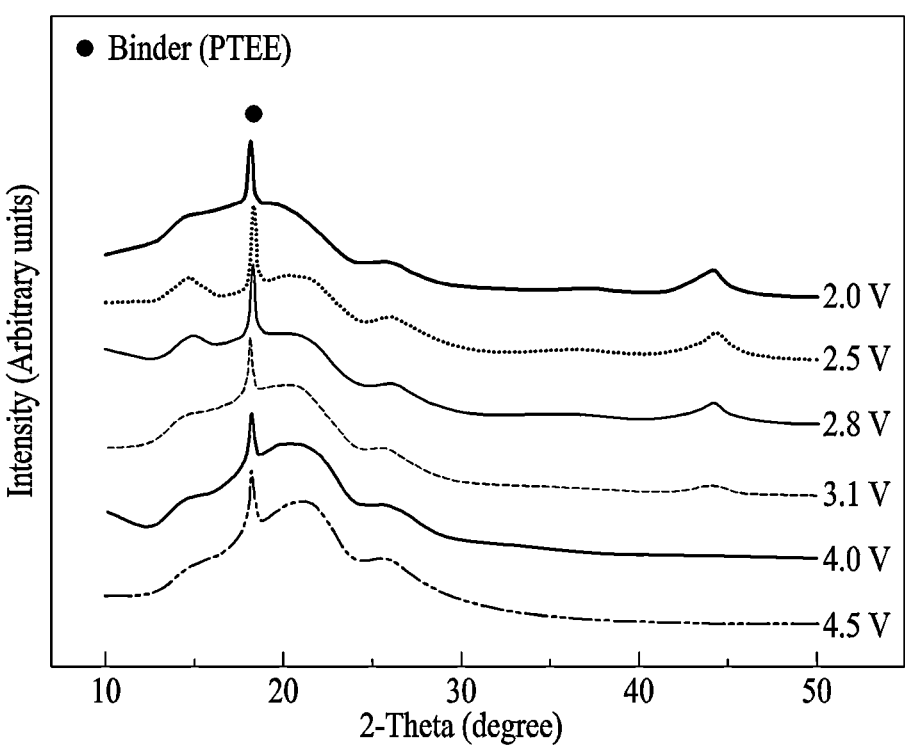

METHOD FOR MANUFACTURING IRON-CHROMIUM OXIDE USING ION EXCHANGE RESIN

CROSS REFERENCE TO RELATED APPLICATIONS

This application is a U.S. National Stage Application of International Application No. PCT/KR2020/017331, filed on Nov. 30, 2020, which claims the benefit under 35 USC 119 (a) and 365(b) of Korean Patent Application Nos. 10-2019-0156996, filed on Nov. 29, 2019 and 10-2020-0164191, filed on Nov. 30, 2020, in the Korean Intellectual Property Office, the entire disclosures of which are incorporated herein by reference for all purposes.

TECHNICAL FIELD

The present invention relates to a method of preparing an iron-chromium oxide using an ion exchange resin, and more particularly, to a method of preparing an iron-chromium oxide usable as a cathode material for lithium-ion batteries.

BACKGROUND ART

In the development of cathode materials for lithium-ion batteries, the main problem to overcome is the specific capacity, which needs to be increased. To date, the cathode materials developed for lithium-ion batteries include layered $LiMO_2$ (M=Mn, Co, and Ni), spinel ($LiMn_2O_4$), and olivine ($LiFeO_4$) crystal structures that are capable of intercalating lithium ions into transition-metal oxide host frameworks, such as Fe, Mn, Co, and Ni, and several conversion-type transition-metal fluorides $MF_3$, $MF_2$ (M=Fe, Mn, Cu, Co, Ni).

Most cathode materials currently used are transition-metal-based intercalation oxides, which are capable of generating a high voltage compared with conversion-type cathode materials. However, transition-metal-based intercalation oxides have a disadvantage in that they have a relatively low capacity. In contrast, conversion-type materials have a relatively high capacity.

Chromium oxides, such as $CrO_2$, $Cr_2O_5$, and $Cr_8O_{21}$, have been reported as potential cathode materials. $Cr_2O_5$ and $Cr_8O_{21}$ showed high specific capacities of 200-350 mAhg$^{-1}$ in the voltage range of 2-4.5 V vs. Li$^+$/Li and can be synthesized by thermal decomposition of $CrO_3$ at 350° C. and 270° C., respectively. The crystal structure of $Cr_2O_5$ was predicted by Hewston and Chamberland using the crystallographic data of $Cr_5O_{12}$ single crystals reported by Wilhelmi. The crystallographic formula of $Cr_5O_{12}$ is $Cr^{3+}{}_2(Cr^{6+}O_4)_3$, with an atomic ratio of 3:2 for $Cr^{6+}$ in tetrahedral sites to $Cr^{3+}$ in octahedral sites. Contrastingly, $Cr_2O_5$ has a formula of $Cr^{3+}{}_2(Cr^{6+}O_4)_2(Cr^{6+}{}_2O_7)$ with a $Cr^{6+}/Cr^{3+}$ atomic ratio of 4:2. The crystal structure of $Cr_8O_{21}$ was analyzed by Norby et al. using neutron diffraction experiments, and the formula was predicted as $C^{3+}{}_2(Cr^{6+}O_4)_2$ $(Cr^{6+}{}_4O_{13})$, with a $Cr^{6+}/Cr^{3+}$ ratio of 6:2. The battery test results of these compounds indicated a higher specific capacity for $Cr_8O_{21}$ than that for $Cr_2O_5$. This can be attributed to the higher content of $Cr^{6+}$ ions in $Cr_8O_{21}$ than that in $Cr_2O_5$, since the redox reaction occurs to $Cr^{6+}$ ions when Li$^+$ ions are inserted in the compound. Therefore, a novel cathode material can be designed by substituting $Cr^{3+}$ ions with another transition metal having an active redox couple to improve the energy density.

DISCLOSURE

Technical Problem

Therefore, the present invention has been developed based on the above-stated problems, with the objective to provide an iron-chromium oxide suitable for application as a novel cathode material for lithium-ion batteries, which has a high specific capacity and generates a high voltage.

More specifically, a cathode material with a high capacity may be achieved by replacing the $Cr^{3+}$ ions with $Fe^{3+}$ ions, which may positively contribute to the electrochemical oxidation/reduction reaction compared with the previously developed $Cr_8O_{21}$ and $Cr_2O_5$ compounds.

Technical Solution

In accordance with one aspect of the present invention, provided is a method preparing an iron-chromium oxide, the method including a step of providing an ion exchange column substituted with $Fe^{3+}$ ions; a step of adding a hexavalent chromium ($Cr^{6+}$) compound to the ion exchange resin column to obtain an ion-exchanged aqueous solution; and a step of heat-treating the ion-exchanged aqueous solution.

In the step of providing an ion exchange column substituted with $Fe^{3+}$ ions, an ion exchange column substituted with $Fe^{3+}$ ions may be provided by adding an aqueous solution containing one or more selected from the group consisting of $FeCl_3$, $FeCl_3.6H_2O$, $Fe(NO_3)_3$, and $Fe(NO_3)_3.9H_2O$ to an ion exchange resin.

The ion exchange resin may be a cation exchange resin.

The hexavalent chromium ($Cr^{6+}$) compound may be $CaCrO_4$, $Na_2CrO_4$, or $K_2Cr_2O_7$.

The ion-exchanged aqueous solution may include $Fe^{3+}$ ions and $Cr^{6+}$ ions.

The heat treatment may be performed under a vacuum atmosphere, an oxygen ($O_2$) atmosphere, a nitrogen ($N_2$) atmosphere, or an argon (Ar) atmosphere.

The heat treatment may be performed at 270-350° C.

In accordance with another aspect of the present invention, provided is a cathode for lithium-ion batteries including the iron-chromium compound prepared by the method.

The iron-chromium compound may have a Fe/Cr ratio of 0.2 to 0.5.

The iron-chromium compound may have a monoclinic unit cell.

Advantageous Effects

According to one aspect of the present invention, the present invention has an effect of providing a cathode material for lithium-ion batteries that has a high specific capacity while exhibiting a voltage similar to that of a transition metal oxide (2 to 4.5 V vs Li$^+$/Li).

DESCRIPTION OF DRAWINGS

FIG. 1 shows the results of thermogravimetric-differential scanning calorimetry analysis for an iron-chromium oxide prepared according to one embodiment of the present invention.

FIG. 2 shows the results of X-ray diffraction analysis for an iron-chromium oxide prepared according to one embodiment of the present invention.

FIG. 3 shows the results of X-ray diffraction analysis for an iron-chromium oxide prepared according to one embodiment of the present invention compared to $Cr_8O_{21}$ and $Cr_2O_5$ prepared by a conventional method, respectively.

FIG. 4 shows the results of Le Bail fitting for the X-ray diffraction pattern of an iron-chromium oxide prepared according to one embodiment of the present invention.

FIG. 5A includes the scanning electron microscope (SEM) images and transmission electron microscope (TEM) images of an iron-chromium oxide prepared according to one embodiment of the present invention.

FIG. 5B includes the scanning electron microscope (SEM) images of $Cr_8O_{21}$ and $Cr_2O_5$ prepared by a conventional method, respectively.

FIGS. 6A to 6C show the results of the battery charge/discharge experiments for the coin cell made of an iron-chromium oxide prepared according to one embodiment of the present invention, and those of $Cr_8O_{21}$ and $Cr_2O_5$ prepared by a conventional method, respectively.

FIG. 7 shows the results of X-ray photoelectron analysis during the battery cell test performed on an iron-chromium oxide prepared according to one embodiment of the present invention; the tests were performed after stopping the coin cells at different discharge voltages (4.5, 4.0, 3.1, 2.8, 2.5, 2.0 V).

FIG. 8 shows the results of comparative analysis of X-ray photoelectron spectra of Cr2p for an iron-chromium oxide prepared according to one embodiment of the present invention, and those of the $Cr_8O_{21}$ and $Cr_2O_5$ prepared by a conventional method, respectively.

FIG. 9 shows the results of X-ray diffraction analysis during the battery cell test performed on an iron-chromium oxide prepared according to one embodiment of the present invention; the tests were performed after stopping the coin cells at different discharge voltages (4.5, 4.0, 3.1, 2.8, 2.5, 2.0 V).

BEST MODE

The present invention will now be described more fully with reference to the accompanying drawings and contents disclosed in the drawings. However, the present invention should not be construed as limited to the exemplary embodiments described herein.

The terms used in the present specification are used to explain a specific exemplary embodiment and not to limit the present inventive concept. Thus, the expression of singularity in the present specification includes the expression of plurality unless clearly specified otherwise in context. It will be further understood that the terms "comprise" and/or "comprising", when used in this specification, specify the presence of stated components, steps, operations, and/or elements, but do not preclude the presence or addition of one or more other components, steps, operations, and/or elements thereof.

It should not be understood that arbitrary aspects or designs disclosed in "embodiments", "examples", "aspects", etc. used in the specification are more satisfactory or advantageous than other aspects or designs.

Although terms used in the specification are selected from terms generally used in related technical fields, other terms may be used according to technical development and/or due to change, practices, priorities of technicians, etc. Therefore, it should not be understood that terms used below limit the technical spirit of the present invention, and it should be understood that the terms are exemplified to describe embodiments of the present invention.

Also, some of the terms used herein may be arbitrarily chosen by the present applicant. In this case, these terms are defined in detail below. Accordingly, the specific terms used herein should be understood based on the unique meanings thereof and the whole context of the present invention.

Meanwhile, terms such as "first" and "second" are used herein merely to describe a variety of constituent elements, but the constituent elements are not limited by the terms. The terms are used only for the purpose of distinguishing one constituent element from another constituent element.

In addition, when an element such as a layer, a film, a region, and a constituent is referred to as being "on" another element, the element can be directly on another element or an intervening element can be present.

Unless defined otherwise, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present invention, and will not be interpreted in an idealized or overly formal sense unless expressly so defined herein.

In addition, in the following description of the present invention, a detailed description of known functions and configurations incorporated herein will be omitted when it may make the subject matter of the present invention unclear. The terms used in the specification are defined in consideration of functions used in the present invention, and can be changed according to the intent or conventionally used methods of clients, operators, and users. Accordingly, definitions of the terms should be understood on the basis of the entire description of the present specification.

Hereinafter, embodiments of the present invention will be described in detail with reference to the accompanying drawings.

A method of preparing an iron-chromium oxide according to one embodiment of the present invention is to prepare an iron-chromium oxide using an ion-exchange chromatographic method, and includes a step of providing an ion exchange column substituted with $Fe^{3+}$ ions; a step of adding a hexavalent chromium ($Cr^{6+}$) compound to the ion exchange resin column to obtain an ion-exchanged aqueous solution; and a step of heat-treating the ion-exchanged aqueous solution.

In the step of providing an ion exchange column substituted with $Fe^{3+}$ ions, an ion exchange column may be provided by adding an aqueous solution containing one or more selected from the group consisting of $FeCl_3$, $FeCl_3 \cdot 6H_2O$, $Fe(NO_3)_3$, and $Fe(NO_3)_3 \cdot 9H_2O$ to an ion exchange resin. More specifically, an ion exchange column substituted with $Fe^{3+}$ ions may be provided by passing an aqueous solution containing $Fe^{3+}$ ions through a cation exchange resin (cation exchanger) or mixing and stirring a cation exchange resin and an aqueous solution containing $Fe^{3+}$ ions. Whether all of the cation exchange resin in the ion exchange column have been substituted with $Fe^{3+}$ ions may be confirmed by passing the aqueous solution through the ion exchange column and measuring the pH of the discharged solution. At this time, the pH may be measured using a litmus test paper. More specifically, when $H^+$ ions are substituted with $Fe^{3+}$ ions, an acidic solution having a pH of 7 or less is discharged during the process of substituting $H^+$ ions with $Fe^{3+}$ ions, and a neutral solution is discharged after all $H^+$ ions are substituted with $Fe^{3+}$ ions. Based on this principle, it can be confirmed that all of the cation exchange resin in the ion exchange resin column have been substituted with $Fe^{3+}$ ions.

The ion exchange resin may be a cation exchange resin.

The hexavalent chromium ($Cr^{6+}$) compound may be $CaCrO_4$, $Na_2CrO_4$, or $K_2Cr_2O_7$.

The ion-exchanged aqueous solution may include $Fe^{3+}$ ions and $Cr^{6+}$ ions.

The heat treatment may be performed under a vacuum atmosphere, an oxygen ($O_2$) atmosphere, a nitrogen ($N_2$) atmosphere, or an argon (Ar) atmosphere.

The heat treatment may be performed at 350° C. or lower or at 270° C. to 350° C. More preferably, the heat treatment is performed under an oxygen ($O_2$) atmosphere, a nitrogen ($N_2$) atmosphere, an argon (Ar) atmosphere, or vacuum. For example, the heat treatment may be performed under a degree of vacuum of $10^{-4}$ torr or less.

In addition, the cathode for lithium-ion batteries of the present invention includes the iron-chromium compound prepared using the above method.

The iron-chromium compound may have a Fe/Cr ratio of 0.2 to 0.5.

The iron-chromium compound may have a monoclinic unit cell.

In addition, the present invention may provide the cathode for lithium-ion batteries including the iron-chromium compound prepared using the above method.

Example 1

A column substituted with $Fe^{3+}$ ions was prepared using an aqueous solution containing $FeCl_3.6H_2O$ and cation-exchange resin IR-120(H).

Subsequently, an aqueous $CaCrO_4$ solution at 80° C. was passed through the column to exchange the $Fe^{3+}$ ions attached to the ion-exchange resin with $Ca^{2+}$ ions, and obtain an aqueous solution containing $Fe^{3+}$ ions and $Cr^{6+}$ ions. The aqueous solution was dried at 80° C. and was subjected to heat treatment at 300-580° C. under a vacuum atmosphere of $1\times10^{-4}$ Torr or less to obtain iron-chromium oxide.

Example 2

The same procedure as in Example 1 was performed except that heat treatment was performed at 270° C. to 350° C. under an oxygen ($O_2$) atmosphere.

Example 3

The same procedure as in Example 1 was performed except that heat treatment was performed at 350° C. under an argon (Ar) atmosphere.

Example 4

The same procedure as in Example 3 was performed except that heat treatment was performed at 350° C. under a nitrogen ($N_2$) atmosphere.

Measurement Example 1.
Thermogravimetric-Differential Scanning Calorimetry (TGA-DSC) Analysis Thermogravimetric-differential scanning calorimetry (TGA-DSC) for the iron-chromium oxide prepared in Example 1 was performed at a heating rate of 10° C./min under a nitrogen ($N_2$) atmosphere of 100 ml/min, and the analysis results are shown in FIG. 1.

Measurement Example 2. X-Ray Diffraction Analysis Using X-Ray Diffractometer (XRD)

X-ray diffraction analysis for iron-chromium oxides prepared in Example 1 (vacuum atmosphere, heat treatment temperature: 300 to 580° C.), Example 2 (oxygen atmosphere, heat treatment temperature: 270 to 350° C.), Example 3 (argon atmosphere, heat treatment temperature: 350° C.), and Example 4 (nitrogen atmosphere, heat treatment temperature: 350° C.) was performed using an X-ray diffractometer (Rigaku X-ray diffractometer, 40 kV, 100 mA) equipped with a Cu-Kα radiation source, and the analysis results were compared with The International Centre for Diffraction Data (ICDD). XRD diffraction pattern analysis results are shown in FIGS. 2 and 3.

As shown in FIG. 2, an $FeCrO_3$ perovskite phase with no battery characteristics was observed in the heat-treated sample prepared at temperatures of 400 and 580° C., which correspond to Example 1. It can be confirmed that heat-treated samples prepared in the temperature range of 270-350° C. under various atmospheres (Examples 2 to 4) exhibited XRD diffraction patterns similar to that of $Cr_2O_5$ obtained by heat-treatment of $CrO_3$ at 350° C. under an oxygen atmosphere; each diffraction pattern is shown in FIG. 3. The synthesis of $Cr_2O_5$ and $Cr_8O_{21}$ was sensitive to the heating temperature. In contrast, in the case of the synthesis method performed in the present invention, it was confirmed that the Fe—Cr—O samples synthesized at temperatures between 270° C. and 350° C. under various atmospheres exhibited similar XRD patterns.

As shown in FIGS. 2 and 3, the XRD diffraction pattern of the Fe—Cr—O compound obtained by heat treatment at 350° C. under vacuum was analyzed using the LeBail fitting method, and the results are shown in FIG. 4. The $Cr_2O_5$ sample analyzed by Hewston et al. had a monoclinic unit cell of a=12.01 Å, b=8.52 Å, c=9.39 Å; β=92.0°. The analysis results of FIG. 4 shows that the Fe—Cr—O compound had a monoclinic unit cell of a=11.97 Å, b=8.59 Å, c=9.19 Å; β=92.76°.

Measurement Example 3. Scanning Electron Microscopy (SEM) and Transmission Electron Microscopy (TEM) Analysis FIG. 5A shows a scanning electron micrograph and transmission electron micrograph of iron-chromium oxide prepared in Example 1 (vacuum, heat treatment temperature: 350° C.). Inductively coupled plasma-atomic emission spectroscopy (ICP-AES) analysis for the iron-chromium oxide used for microphotography confirmed that the component ratio of chromium to iron was 3:1. Hexagonal column-shaped crystal clusters were observed at a magnification of 200,000× (FIG. 5A, upper left image), and each hexagonal column-shaped particle consisted of smaller particles with a size of several tens of nanometers observed at a high magnification of 3 million× (FIG. 5A, upper right image). The shape and size of these small particles were confirmed using transmission electron microscopy (TEM) (FIG. 5A, lower images), and particles with diameters of approximately 30-40 nm were observed. The material observed above is composed of crystal grains with sizes that are at least 100× times smaller (several μm) than the size of $Cr_8O_{21}$ and $Cr_2O_5$ crystals synthesized by heat treatment of $CrO_3$ at 270 and 350° C., respectively (FIG. 5B), which indicated that the crystallization was achieved via different processes during synthesis. These results are consistent with the change in peak broadening observed in the X-ray diffraction pattern shown in Measurement Example 2.

Measurement Example 4. Charging/Discharging Analysis

A coin cell was manufactured using iron-chromium oxide (composition ratio of chromium to iron: 3:1) prepared in Example 1 (vacuum, heat treatment: 350° C.) and analyzed in Measurement Example 3, and a battery charge/discharge experiment was performed. The results are shown in FIG. 6A. For a performance comparison analysis with conventional $Cr_8O_{21}$ and $Cr_2O_5$, coin cells were assembled in the same procedure using $Cr_8O_{21}$ and $Cr_2O_5$ powder (specimens analyzed in Measurement Examples 2 and 3), and battery charge/discharge experiments were performed under the same conditions. The results are shown in FIG. 6B ($Cr_8O_{21}$) and 6C ($Cr_2O_5$).

The oxide electrodes were fabricated using a mixture of the active materials, acetylene black, and polytetrafluoroethylene (PTFE) taken in a ratio of 70:20:10 weight percentage. One molar $LiPF_6$ in ethylene carbonate (EC)/diethyl carbonate (DEC)/dimethyl carbonate (DMC) (1:1:1 by volume) was used as the electrolyte, and a lithium metal foil (14-mm diameter circular disk) was used as the counter and reference electrodes. The electrode, separator, and electrolyte were assembled and sealed in an Ar-filled glove box to obtain the cells.

As shown in FIGS. 6A-C, when repeated five times at a C/10 rate, a voltage of 2-4.5 V vs $Li^+/Li$ was observed. After five cycles, the charge/discharge capacities of $Cr_8O_{21}$, $Cr_2O_5$, and iron-chromium oxide were 210, 280, and 380 mAh/g, respectively. It was confirmed that $Cr_8O_{21}$ and $Cr_2O_5$ were nearly consistent with previous experimental results. Based on these comparative experimental results and the battery performance analysis using iron-chromium oxide prepared in Example 1 as a cathode material, it was confirmed that a charge/discharge capacity higher than 100 mAh/g was obtained compared with previously developed $Cr_8O_{21}$ and $Cr_2O_5$.

Measurement Example 5. X-Ray Photoelectron Analysis for Electrode Sample after Charging/Discharging After the coin cell composed of the iron-chromium oxide used in the charge/discharge experiment performed in Measurement Example 4 was stopped at different discharge voltages (4.5, 4.0, 3.1, 2.8, 2.5, 2.0 V), the coin cell was moved into a glove box, disassembled, and X-ray photoelectron analysis was performed while the cathode electrode was not exposed to air. The results are shown in FIG. 7, indicating a change in the valence states of the chromium ions from $Cr^{6+}$ at 4.5 V to $Cr^{3+}$ with the insertion of Li ions.

The comparative analysis between $Cr_8O_{21}$, $Cr_2O_5$, and iron-chromium oxide in Measurement Example 4 revealed the cause of the difference in charge/discharge capacity, which and can be attributed to the difference in the atomic ratios of tetrahedral $Cr^{6+}$ to octahedral $Cr^{3+}$. Atomic ratio of $Cr^{6+}/Cr^{3+}$ is 2 and 3 for $Cr_2O_5$ and $Cr_8O_{21}$, respectively, as previously reported. The $Cr_8O_{21}$ compound, with relatively more $Cr^{6+}$ ions which can participate in the oxidation/reduction reaction during battery charging/discharging, showed higher charge/discharge capacity than $Cr_2O_5$. In the case of iron-chromium oxide prepared in Example 1, the iron-chromium oxide was predicted to have a monoclinic crystal structure similar to that of $Cr_2O_5$, as shown in FIG. 4, and the ICP-AES analysis indicated that the composition Cr/Fe ratio was 3.0. Based on these results, the crystallographic formula for Fe—Cr—O can be estimated as $Fe^{3+}_xCr^{3+}_{2-x}(Cr^{6+}O_4)_2(Cr^{6+}_2O_7)$ assuming some $Cr^{3+}$ of $Cr_2O_5$ ($=Cr_2^{3+}(Cr^{6+}O_4)_2(Cr_2^{6+}O_7)$) is substituted with $Fe^{3+}$, whereas the ICP-AES (Cr/Fe=3.0) suggested the formula to be $Fe^{3+}_{1.5}Cr^{3+}_{0.5}(Cr^{6+}_2O_4)_2(Cr^{6+}_2O_7)$. In this case, the $Cr^{6+}/Cr^{3+}$ ratio was 8, which is 2.5 times greater than that of the $Cr_8O_{21}$ (3). The substituted $Fe^{3+}$ ions may participate in the oxidation/reduction reaction and contribute to higher capacitive properties. To confirm this experimentally, X-ray photoelectron analysis was performed on $Cr_8O_{21}$, $Cr_2O_5$, and iron-chromium oxide, and the results are shown in FIG. 8. As expected, the relative peak intensities ($Cr^{6+}/Cr^{3+}$) of $Cr2p_{3/2}$ were in the order of $Fe^{3+}_{1.5}Cr^{3+}_{0.5}Cr^{6+}_4O_{15}>Cr_8O_{21}>Cr_2O_5$, which corresponded with the order of the $Cr^{6+}/Cr^{3+}$ ratio.

Measurement Example 6. X-Ray Diffraction Analysis for Electrode Sample after Charging/Discharging After the coin cell used in the charge/discharge experiment performed in Measurement Example 4 was stopped at different discharge voltages (4.5, 4, 3.1, 2.8, 2.5, and 2.0 V), it was moved into a glove box, disassembled, and X-ray diffraction analysis was performed on a sample sealed with a Kapton film. The results are shown in FIG. 9.

The crystalline peak, which observed in X-ray diffraction patterns of Example 2 (FIGS. 2 and 3) performed on the powder samples, disappeared and new peaks were observed at approximately 45° as lithium was inserted. These results are consistent with the experimental results for $Cr_2O_5$ previously published in literature (Xu-Yong Feng, Ning Ding, Li Wang, Xiao-Hang Ma, Yong-Ming Li, and Chun-Hua Chen, *J. Power Sources*, 2013, 222, 184-187.).

Meanwhile, embodiments of the present invention disclosed in the present specification and drawings are only provided to aid in understanding of the present invention and the present invention is not limited to the embodiments. It will be apparent to those skilled in the art that various modifications can be made to the above-described exemplary embodiments of the present invention without departing from the spirit and scope of the invention.

The invention claimed is:

1. A method of preparing an iron-chromium oxide, comprising:
   providing an ion exchange column substituted with $Fe^{3+}$ ions;
   adding a hexavalent chromium ($Cr^{6+}$) compound to the ion exchange resin column to obtain an ion-exchanged aqueous solution; and
   heat-treating the ion-exchanged aqueous solution,
   wherein the heat-treating is performed at 270° C. to 350° C.

2. The method according to claim 1, wherein, in the providing the ion exchange column substituted with $Fe^{3+}$ ions, the ion exchange column substituted with $Fe^{3+}$ ions is provided by adding an aqueous solution containing one or more selected from the group consisting of $FeCl_3$, $FeCl_3·6H_2O$, $Fe(NO_3)_3$, and $Fe(NO_3)_3·9H_2O$ to an ion exchange resin.

3. The method according to claim 2, wherein the ion exchange resin is a cation exchange resin.

4. The method according to claim 1, wherein the hexavalent chromium ($Cr^{6+}$) compound is $CaCrO_4$, $Na_2CrO_4$, or $K_2Cr_2O_7$.

5. The method according to claim 1, wherein the ion-exchanged aqueous solution comprises $Fe^{3+}$ ions and $Cr^{6+}$ ions.

6. The method according to claim 1, wherein the heat-treating is performed under a vacuum atmosphere, an oxygen ($O_2$) atmosphere, a nitrogen ($N_2$) atmosphere, or an argon (Ar) atmosphere.

\* \* \* \* \*